No. 725,694. PATENTED APR. 21, 1903.
C. A. FORSBERG.
WIRE FENCE MACHINE.
APPLICATION FILED NOV. 29, 1902.
NO MODEL. 2 SHEETS—SHEET 1.
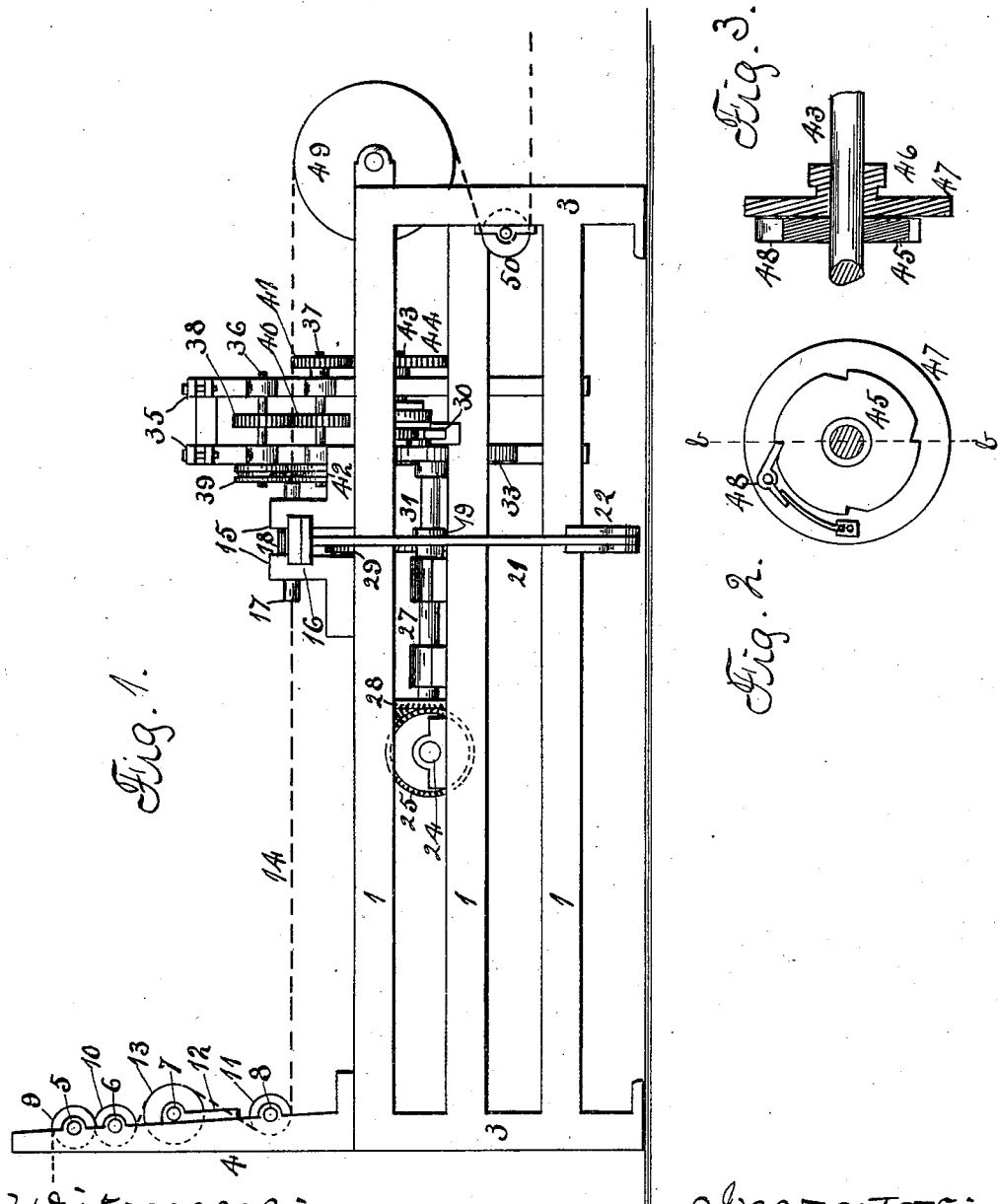
Witnesses:
J. S. Clark
Wm E Griggs
Inventor:
Charles A. Forsberg
By A. O. Behel
Atty

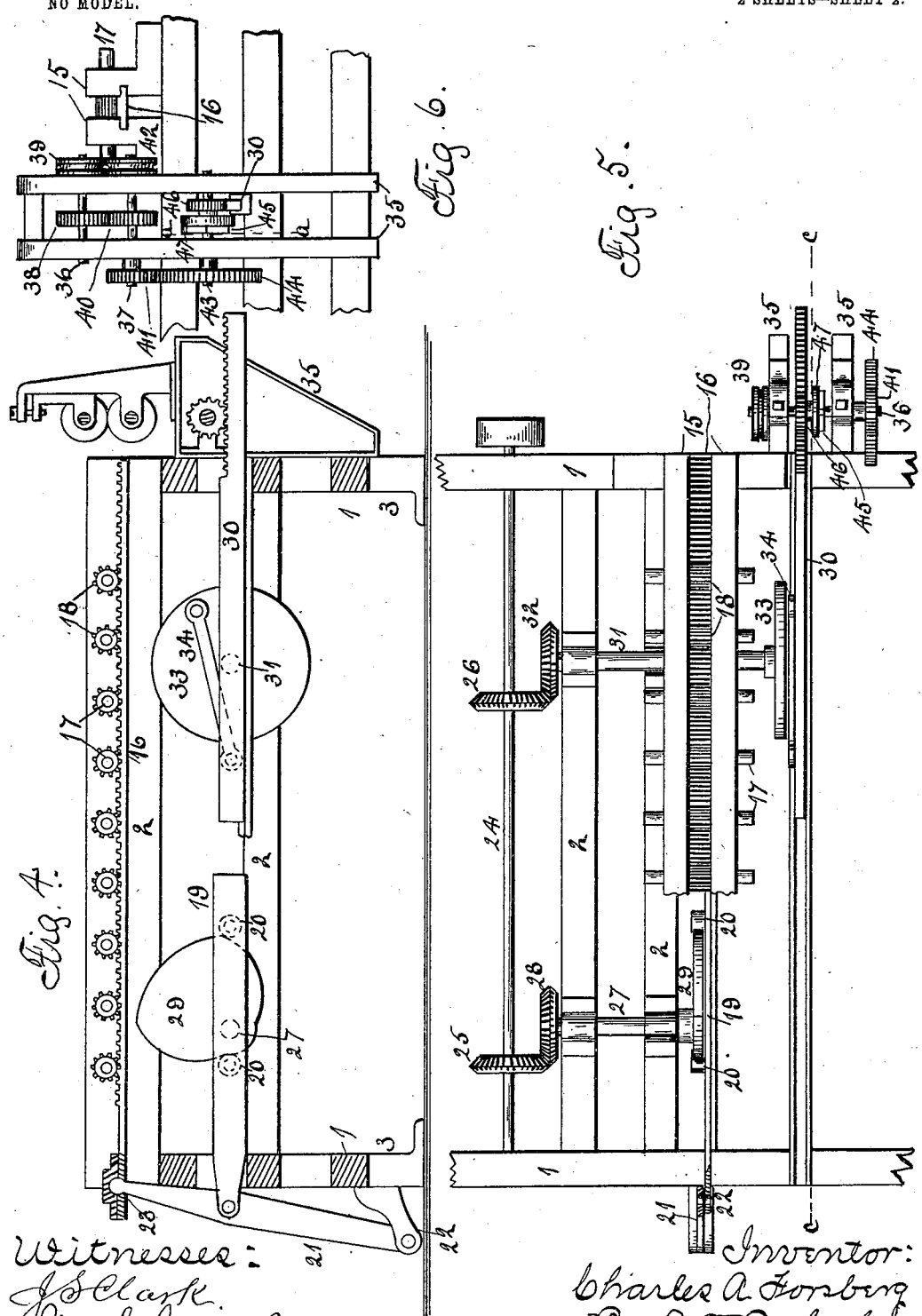

UNITED STATES PATENT OFFICE.

CHARLES A. FORSBERG, OF ROCKFORD, ILLINOIS.

WIRE-FENCE MACHINE.

SPECIFICATION forming part of Letters Patent No. 725,694, dated April 21, 1903.

Application filed November 29, 1902. Serial No. 133,304. (No model.)

*To all whom it may concern:*

Be it known that I, CHARLES A. FORSBERG, a citizen of the United States, residing at Rockford, in the county of Winnebago and State of Illinois, have invented certain new and useful Improvements in Fence-Making Machines, of which the following is a specification.

The object of this invention is to construct a fence-making machine in which the twister-heads are intermittently rotated by a toothed rack and a cam is employed to reciprocate the rack, in which the feeder and crimper wheels are intermittently rotated by the toothed rack and a crank-head having a link connection with the toothed rack, and in which an adjustable tension is employed to the line or lengthwise wires.

In the accompanying drawings, Figure 1 is a side elevation. Fig. 2 is a section on dotted line $a$, Fig. 6. Fig. 3 is a section on dotted line $b$, Fig. 2. Fig. 4 is a section on dotted line $c$, Fig. 5. Fig. 5 is a partial plan view. Fig. 6 is a side elevation of the mechanism for operating the feeding-rolls.

In the drawings I have only shown such parts of a fence-making machine necessary to an understanding of the location of my improvements thereto.

The main supporting-frame comprises the lengthwise beams 1, cross-beams 2, and vertical supports 3. The feed end of the machine has uprights 4, supporting a series of shafts 5, 6, 7, and 8. The shafts 5, 6, and 8 support rollers 9, 10, and 11, respectively, and the shaft 7 is supported in boxes 12, which have an adjustable connection with the uprights 4, so as to locate the rollers 13, supported by the shaft 7, a proper distance from the rollers 10 to give the required tension to the lengthwise wires 14, forming the fence, as it passes around the different sets of rollers above mentioned.

To the upper lengthwise beams are secured two supports 15, extending across the machine, and the inner faces of the supports are provided with lengthwise grooves which support a toothed rack 16 in a manner to permit it to reciprocate. These supports also support the twister-heads 17, and each twister-head has a toothed pinion 18 connected therewith, and the series of pinions mesh with the toothed rack 16, and as the rack is reciprocated the pinions are reversibly rotated.

A slide 19 is supported by the cross-bars of the main frame and supports two rollers 20. The outer end of this bar has a pivotal connection with an arm 21 between its ends. The lower end of this arm has a pivotal connection with a bracket 22, secured to the main frame, and its upper end has a circular enlargement 23, which is located in a corresponding recess formed on the outer end of the toothed rack 16.

A main driving-shaft 24 is supported by the main frame, and it supports two beveled gear-wheels 25 and 26. A shaft 27 is supported by the main frame and has a beveled gear-wheel 28, meshing with the beveled gear-wheel 25. The free end of this shaft 27 supports a cam 29, which is located between the rollers 20, so that as the cam is rotated it will impart a reciprocating movement to the slide 19, and through the arm 21 a reciprocating movement is imparted to the toothed rack 16. This cam 29, engaging the rollers 20, will move the slide positively in both directions.

A toothed rack 30 is supported by the main frame. A shaft 31 is supported by the main frame and has a beveled gear-wheel 32 meshing with the beveled gear-wheel 26. The free end of this shaft supports a crank-head 33. A link 34 forms a connection between the crank-head and toothed rack 30 in order that the rotation of the crank-head will reciprocate the toothed rack 30. A frame composed of the bars 35 is supported by the main frame. This frame supports two standards which support two shafts 36 and 37. The shaft 36 supports a toothed wheel 38 and a feed-wheel 39, and the shaft 37 supports two toothed wheels 40 and 41 and a feed-wheel 42. The toothed wheels 38 and 40 mesh together. A shaft 43 is supported by the bars 35 and supports a toothed wheel 44, which meshes with the toothed wheel 41. To this shaft 43 is secured a ratchet-wheel 45, and on it are loosely mounted a toothed wheel 46 and disk 47, carrying a spring-actuated dog 48. As the rack reciprocates it will revolve the toothed wheel 46 and disk 47, carrying the dog 48. This dog will engage the notch in the ratchet-wheel 45 and impart a rotary movement to the ratchet-wheel and shaft 43, supporting it. This rotary movement of the shaft will rotate the ratchet-wheel 45, and it in turn will rotate the toothed wheels 38, 41, and 44, and the rotary movement of the toothed wheel 41 will rotate the toothed wheels 38 and 40 and wire-guide wheels 39 and 42. As the toothed rack 30 moves in one direction the dog 48 will click over the ratchet-wheel, which will allow the feed-wheels to stand still, and when moved in the other direction the feed-wheels will be rotated.

The operation of this machine so far as the manufacture of wire fence is concerned is the same as other machines—that is, the line-wires are fed through the twister-heads, over the drum 49, and roller 50 to the reel. The wire forming the stays is fed in by the feed-rollers 39 and 42, and the knife for cutting off the stays is not shown, as it forms no part of my invention. By means of the boxes 12 being adjustable the rollers 13 carried thereby can be moved toward and from the rollers 10 in order to vary the tension given to the line-wires. The line-wires are drawn through the twister-heads by the rotation of the drum, and the means for imparting an intermittent rotary movement to the drum is not shown, such devices being old.

I claim as my invention—

1. In a wire-fence-making machine, the combination of the main frame, twister-heads, a toothed rack for rotating the twister-heads, a link having a pivotal connection with the main frame and a pivotal connection with the toothed rack, a bar having a pivotal connection with the link, two rollers supported by the bar, and a cam engaging the rollers, thereby imparting a reciprocating movement to the toothed rack.

2. In a wire-fence-making machine, the combination of a main frame, two feed-rollers, a toothed rack for imparting an intermittent rotary movement to the feed-rollers, a crank-head, and a link forming a connection between the crank-head and toothed rack.

3. In a wire-fence-making machine, the combination of a main frame, two feed-rollers, a toothed rack for imparting an intermittent rotary movement to the feed-rollers, a toothed wheel engaging the toothed rack, a dog carried by the toothed wheel, a ratchet-wheel with which the dog engages, and intermediate gears between the ratchet-wheel and feed-rollers.

CHARLES A. FORSBERG.

Witnesses:
A. O. BEHEL,
E. BEHEL.